UNITED STATES PATENT OFFICE.

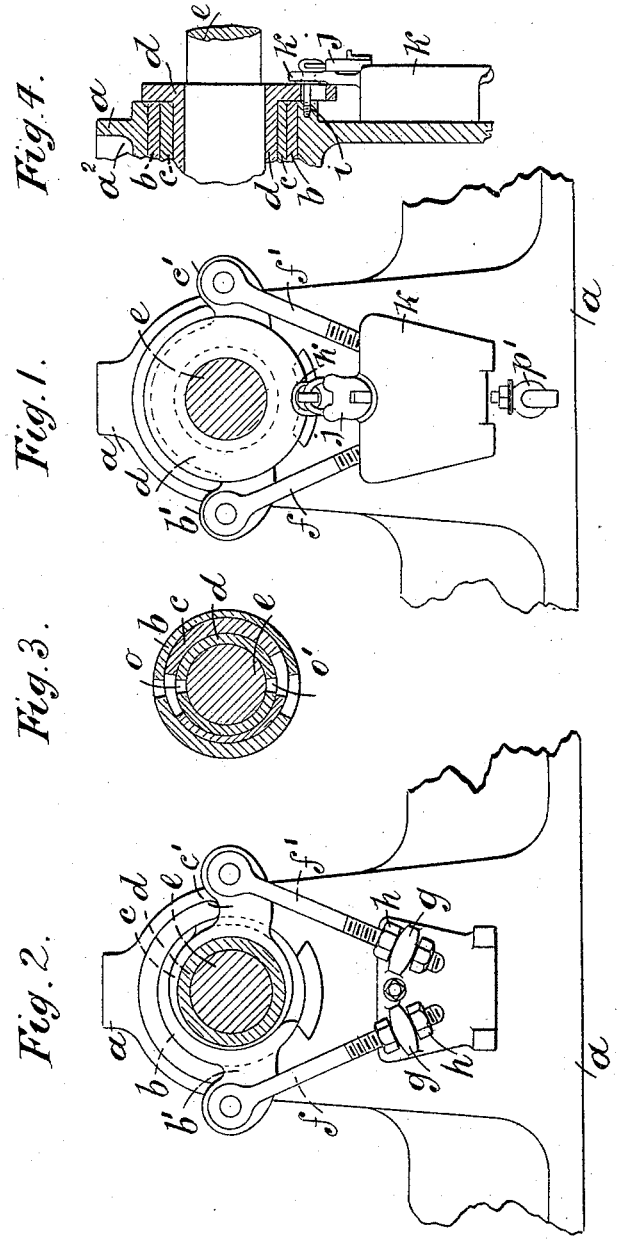

BENJAMIN ALFRED DOBSON, OF BOLTON, COUNTY OF LANCASTER, ENGLAND.

ADJUSTABLE SHAFT-BEARING.

SPECIFICATION forming part of Letters Patent No. 395,428, dated January 1, 1889.

Application filed July 26, 1888. Serial No. 281,054. (No model.) Patented in England March 10, 1888, No. 3,699.

*To all whom it may concern:*

Be it known that I, BENJAMIN ALFRED DOBSON, a subject of the Queen of Great Britain, and a resident of Bolton, in the county of Lancaster, England, have invented certain new and useful Improvements in Adjustable Bearings for Rotating Shafts, (for which I have received Letters Patent in England, dated March 10, 1888, No. 3,699,) of which the following is a specification.

The invention consists in an improved means for adjusting the bearings of rotating shafts. As means or devices for this purpose I employ eccentric sleeves, which are adjustable around the shafts.

My invention is particularly intended for application to carding-engines for the purpose of easily and quickly adjusting the position of the main cylinder and its shaft. The invention is, however, adapted for use in connection with various other shafts.

In the accompanying drawings, Figure 1 is an end elevation, and Fig. 2 an elevation partly in section of the front side of a pedestal fitted with my improved adjustable shaft-bearing. Fig. 3 is a transverse vertical section of the shaft and the adjustable bearing. Fig. 4 is a side sectional elevation of the pedestal, the bearing, and the shaft.

Similar letters refer to similar parts throughout the several views.

In the views, $a$ designates the pedestal bored out to receive an eccentric sleeve, $b$, within which is fitted an eccentric, $c$, and in the latter is fitted the flanged bushing $d$, which is preferably made of phosphor-bronze and encircles the journal of shaft $e$. In this case the eccentrics $b$ $c$ are formed with lateral lugs or ears $b'$ and $c'$, respectively, and to these ears are pivoted screw-threaded rods $f$ or $f'$, which pass through eyebolts $g$, secured to the pedestal $a$. Nuts $h$ are applied to said rods $f$ and $f'$, by turning which the relative positions of the eccentrics $b$ and $c$ may be altered—that is to say, they may be adjusted around the shaft, so as to raise or lower the bushing $d$ or shift it laterally, and thus adjust the shaft $e$ as required. The bushing $d$ is kept from turning with the shaft $e$ as the latter revolves by means of a stud, $i$, which screws into the pedestal. Before the adjusting mechanism can be operated the padlock $j$ must be released, and the casing $k$, which incloses the nuts, eyes, and ends of the stud $f f'$, turned back or removed.

A great advantage obtained by my improved bearing is that all the wear takes place in the bushing, and whatever the adjustment of the bearing the shaft will lie in the bed formed by it in the bushing $d$.

I have shown and described lugs or ears on the eccentrics, combined with nuts and screw-threaded rods, as the means for adjusting the eccentrics; but it is obvious that other means may be employed for this purpose.

What I claim as my invention, and desire to secure by Letters Patent, is—

1. The improved shaft-bearing consisting, essentially, of the following parts, combined substantially as shown and described: a non-rotating metal bushing forming a journal for the shaft and fitted within an eccentric sleeve, which is fitted within a second eccentric sleeve supported by the pedestal, and means for operating the eccentrics to adjust the position of the shaft with the said bushing as required.

2. The combination, with the pedestal $a$, of the bushing $d$, forming a journal for the shaft $e'$, the pair of eccentrics $b$ $c$, the screw-threaded rods $f f'$, nuts $h$, and eyes $g$, attached to the pedestal, all substantially as and for the purposes herein shown and described.

In testimony that I claim the foregoing as my invention I have signed my name, in presence of two witnesses, this 13th day of July, 1888.

BENJAMIN ALFRED DOBSON.

Witnesses:
 ROBERT WINDER,
  *Notary Public, Bolton.*
 WALTER HIGGINSON,
  *Clerk,* 106 *Davenport St., Bolton.*